USOO5557519A

United States Patent [19]
Morita

[11] Patent Number: 5,557,519
[45] Date of Patent: Sep. 17, 1996

[54] APPARATUS FOR DETECTING THE RUNNING RESISTANCE OF A VEHICLE

[75] Inventor: Shigeki Morita, Himeji, Japan

[73] Assignee: Mitsubishi Denki Kabushiki Kaisha, Tokyo, Japan

[21] Appl. No.: 375,247

[22] Filed: Jan. 19, 1995

Related U.S. Application Data

[63] Continuation of Ser. No. 796,373, Nov. 22, 1991, abandoned.

[30]     Foreign Application Priority Data

Nov. 26, 1990  [JP]  Japan .................................. 2-324257

[51] Int. Cl.$^6$ .................................................. B60K 31/04
[52] U.S. Cl. .................. 364/424.01; 364/424.1; 364/426.04; 364/431.07; 123/349; 123/435
[58] Field of Search ................. 364/424.01, 426.04, 364/431.03, 431.07, 424.05; 477/115, 120, 72, 97, 98; 123/435, 41.05, 349, 352

[56]           References Cited

U.S. PATENT DOCUMENTS

| | | | |
|---|---|---|---|
| 3,640,156 | 2/1972 | Mori et al. | 74/866 |
| 4,807,497 | 2/1989 | Yasue et al. | 74/867 |
| 4,811,223 | 3/1989 | Iwatsuki et al. | 364/424.1 |
| 4,819,187 | 4/1989 | Yasue et al. | 364/431.01 |
| 4,829,438 | 5/1989 | Etoh | 364/426.04 |
| 4,833,612 | 5/1989 | Okuno et al. | 364/426.04 |
| 4,870,584 | 9/1989 | Etoh et al. | 364/426.04 |
| 4,941,365 | 7/1990 | Reiner et al. | 73/865 |
| 4,945,481 | 7/1990 | Iwatsuki et al. | 364/424.1 |
| 4,953,093 | 8/1990 | Etoh | 364/426.04 |
| 5,035,160 | 7/1991 | Morita | 74/866 |
| 5,048,631 | 9/1991 | Etoh | 180/179 |
| 5,231,582 | 7/1993 | Takahashi et al. | 364/424.1 |

FOREIGN PATENT DOCUMENTS

| | | |
|---|---|---|
| 2001941 | 10/1970 | Germany . |
| 1954757 | 8/1977 | Germany . |
| 3128657 | 4/1982 | Germany . |
| 3613685 | 3/1987 | Germany . |
| 2852195 | 8/1987 | Germany . |
| 4112577 | 10/1991 | Germany . |

*Primary Examiner*—Kevin J. Teska
*Assistant Examiner*—Tan Nguyen
*Attorney, Agent, or Firm*—Sughrue, Mion, Zinn, Macpeak & Seas

[57]           ABSTRACT

A running resistance detecting apparatus detects a running resistance of a vehicle indicative of the running state thereof on the basis of an engine torque and a vehicle acceleration. A number of devices, such as a cruise control device, an automatic transmission device, a traction control device, a power steering device, a suspension control device and the like, can be controlled in accordance with the running resistance of the vehicle thus calculated. The control performance of these devices can significantly be enhanced together with improved maneuverability of the vehicle.

9 Claims, 7 Drawing Sheets

APPARATUS FOR DETECTING THE RUNNING RESISTANCE OF A VEHICLE

This is a continuation of application Ser. No. 07/796,373 filed Nov. 22, 1991 now abandoned

BACKGROUND OF THE INVENTION

The present invention relates to a running resistance detecting apparatus for a vehicle, which apparatus is capable of detecting a running resistance of an automobile without being affected by running conditions thereof.

In a conventional control apparatus for altering a control method or mode as well as control parameters involved in controlling operations of a motor vehicle, the control constants are altered or changed in accordance with the running resistance previously determined on the basis of speed data obtained for the running on a level road or in fluordance with the amount a throttle valve is opened for the purpose of coping with an increase in the running resistance, which can occur during uphill driving. In another known apparatus, the resistance value previously determined on the basis of the degree of opening of the throttle and the vehicle speed at the time when acceleration is zero is corrected as a function of the change in the acceleration, as is disclosed in Japanese Patent Application No. 63-144367.

As understood from the above, in the apparatus known heretofore, the running resistance which the motor vehicle is subjected to in uphill driving or upon acceleration is estimated simply on the basis of the vehicle speed and the throttle opening degree. However, it has been round difficult to determine the running resistance with any satisfactory accuracy using only these parameters. On the other hand, determination of the running resistance in the state in which the acceleration is zero is subjected to severe limitations because such a state only rarely occurs.

Such being the circumstance, an the apparatus, such as a cruise control apparatus controlled by the known running resistance detecting means, suffers from a problem that a control gain changes significantly in uphill/downhill running, resulting in a repetition of acceleration and deceleration and hence unwanted hunting, because the running resistance is determined on the basis of the speed of the motor vehicle running on a level road. Further, it is noted that in an engine including an automatic transmission or the like, the running state or mode is controlled by altering related control constants through manual operation of a relevant switch by the driver, which means that a burden imposed on the driver increases or acceleration performance is degraded when the switch manipulation is neglected.

SUMMARY OF THE INVENTION

It is therefore an object of the present invention to provide a running resistance detecting apparatus for a vehicle which can determine the running resistance with high accuracy and improved reliability without suffering from the shortcomings of the above-described known apparatuses.

In order to achieve the above object, according to the present invention, there is provided a running resistance detecting apparatus for a vehicle having an engine, comprising: torque sensing means for sensing an output torque of the engine and generating a corresponding output signal; acceleration calculating means for calculating an acceleration of the vehicle and generating a corresponding output signal; and running resistance calculating means for calculating a running resistance of the vehicle indicative of the running state thereof on the basis of the engine torque sensed by the torque sensing means and the vehicle acceleration calculated by the acceleration calculating means.

Since the running resistance of the vehicle is arithmetically determined on the basis of the engine torque and the vehicle acceleration, it is possible to detect consecutively the running resistance with high accuracy without being affected by the vehicle speed, winds flowing against the vehicle during travelling, road conditions and other factors, whereby control performances of those devices which are required to change control modes and control parameters for realizing optimal control of the vehicle can be enhanced. Besides, because the control constants and the control modes can automatically be so changed or modified as to be suited for the current running state of the vehicle, a burden imposed on the driver can be mitigated.

The above and other objects, features and advantages of the invention will be better understood by reading the following detailed description taken in conjunction with the accompanying drawings.

DESCRIPTION OF THE PREFERRED EMBODIMENTS

The present invention will now be described in detail in conjunction with preferred or exemplary embodiments thereof by reference to the accompanying drawings.

Figure 1:
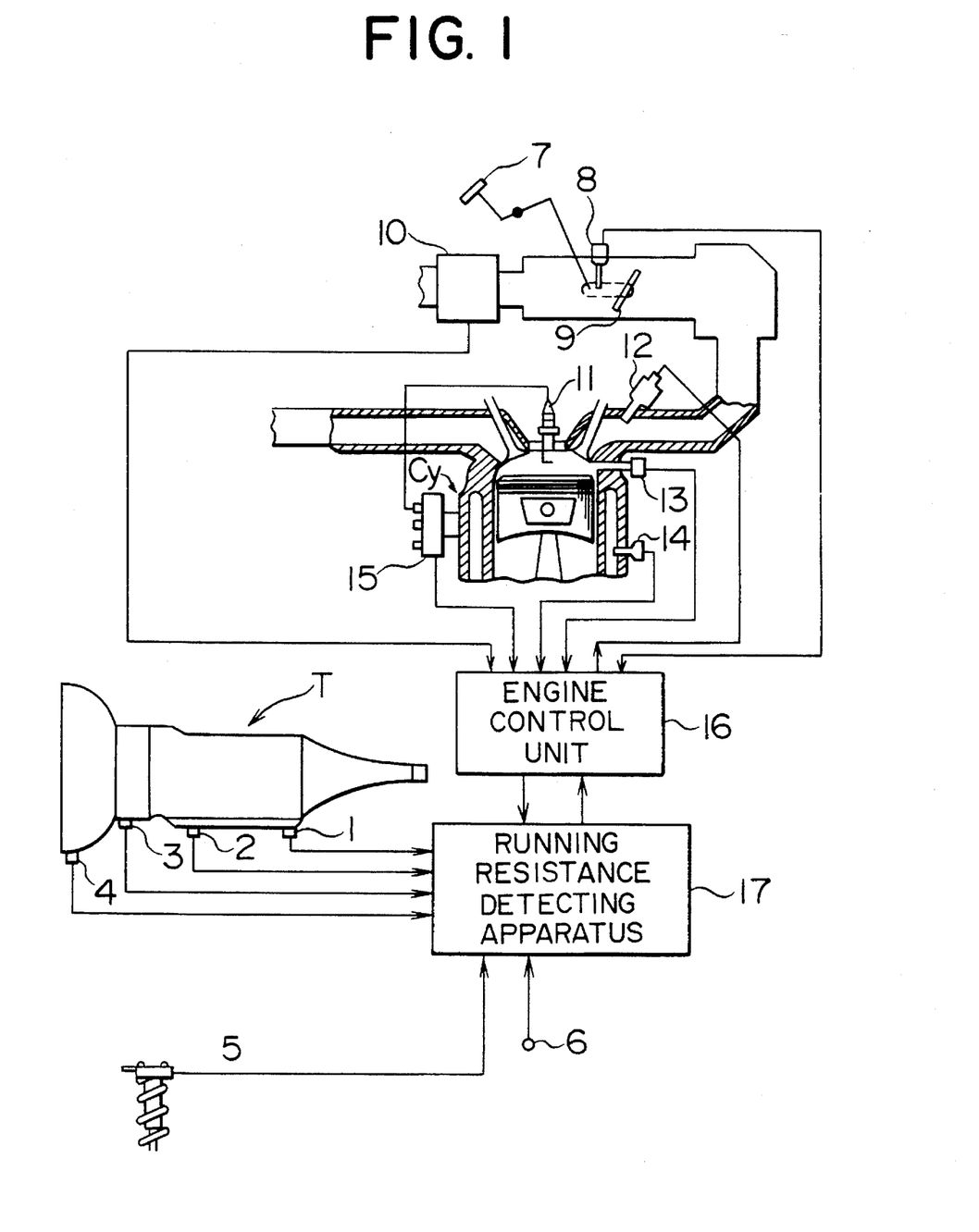
FIG. 1 is a block diagram generally showing the structure of an internal combustion engine to which a running resistance detecting apparatus according to an embodiment of the invention is applied.

FIG. 1 is a schematic diagram generally showing the structure of an internal combustion engine for a motor vehicle to which a running resistance detecting apparatus according to an embodiment of the invention is applied. In the figure, the engine illustrated includes a plurality of engine cylinders Cy (only one is illustrated), and an automatic transmission T for transmitting the engine output power from an unillustrated crankshaft to drive road wheels of the vehicle with an appropriate transmission ratio. A vehicle speed sensor 1 senses the speed of a vehicle at which the vehicle is running. The vehicle speed sensor 1 may be constituted, for example, by a pulse generator which is mounted on an unillustrated output shaft of the transmission. A neutral or inhibitor switch 2 senses a neutral state of the transmission T. A turbine speed sensor 3 senses the rotational speed (rpm) of a turbine of the automatic transmission T. A turbine input speed sensor 4 senses the rotational speed (rpm) of an unillustrated input shaft of the transmission T representative of the rotational speed of the engine. A weight sensor 5 senses the total weight of the vehicle including a load carried thereby. A brake switch 6 senses a braked condition of the vehicle. The engine further includes an accelerator pedal 7, a throttle sensor 8 for sensing the opening degree of a throttle valve 9 in an intake manifold, an air flow sensor 10 for sensing the flow rate of intake air sucked into the engine, a spark plug 11, a fuel injector 12, a pressure sensor 13 for sensing the intake pressure or the pressure of intake air in the intake manifold, a temperature sensor 14 for sensing the temperature of an engine coolant indicative of the engine temperature, a crank angle sensor 15 for sensing the crank angle or position of an unillustrated crankshaft, an engine control unit 16 for controlling the operation of the engine, and a running resistance detecting apparatus 17 of the invention for detecting the running resistance of the vehicle.

Figure 2:
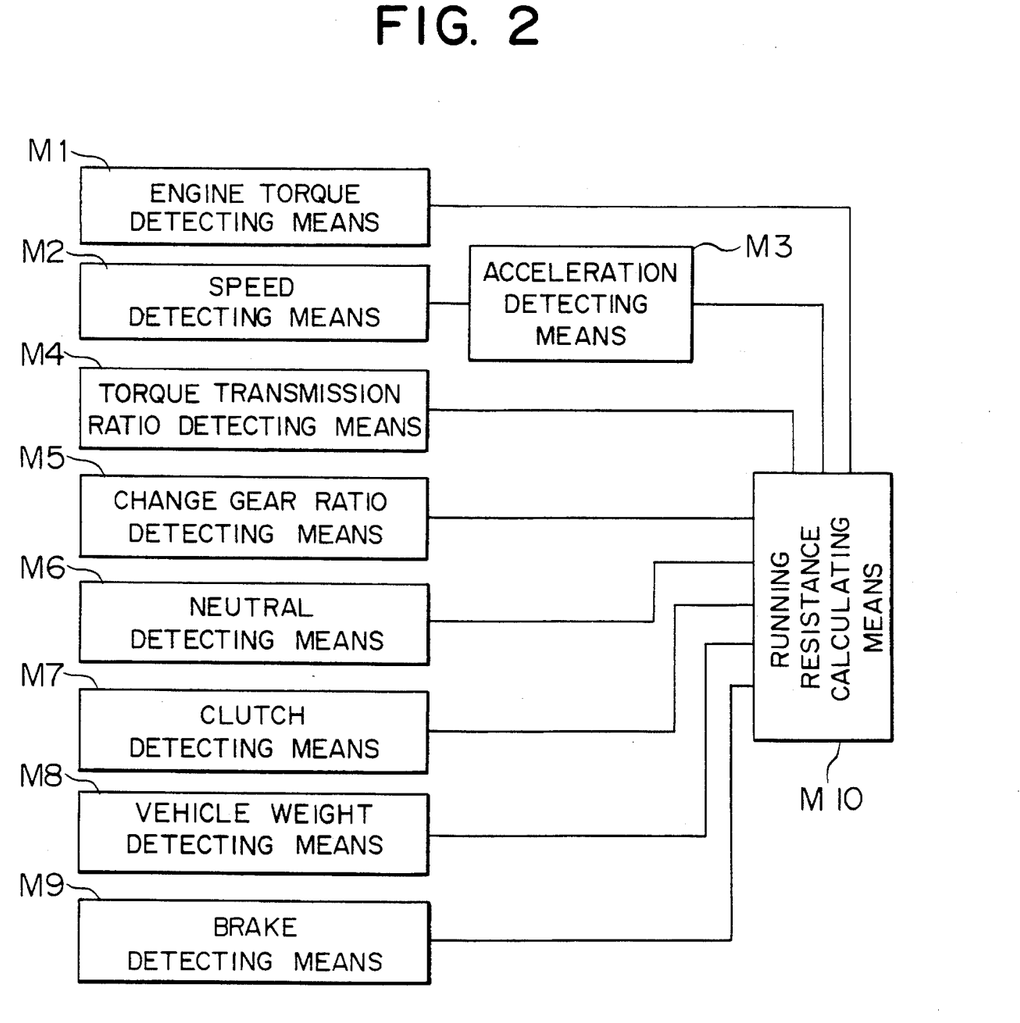
FIG. 2 is a functional block diagram showing a structure of the running speed detecting apparatus of FIG. 1.

FIG. 2 is a functional block diagram showing major components constituting the running resistance detecting apparatus 17 of FIG. 1. As illustrated in this figure, the apparatus 17 includes an engine torque detecting means M1 for detecting the magnitude of an output torque of the engine based on the output signal from the turbine input speed sensor 4, and a vehicle speed detecting means M2 for detecting and calculating the running speed of the vehicle based on the output signal from the speed sensor 1. For suppressing fluctuations in the speed detection output signal, the vehicle speed detecting means M2 may incorporate an appropriate filter. An acceleration detecting unit M3 arithmetically determines an acceleration of the motor vehicle. To this end, the acceleration detecting unit M3 may be so implemented as to periodically detect the output of the speed sensor 1 at a predetermined interval and determine an acceleration of the motor vehicle on the basis of a difference in speed between a current sampling time point and a preceding sampling time point, wherein a difference or variation in the vehicle speed within a predetermined period, for example, of 0.1 to 2 sec. is detected as an acceleration (or deceleration). The acceleration calculating unit M3 may also incorporate a filter for suppressing fluctuations in the detected acceleration signal.

Figure 4:
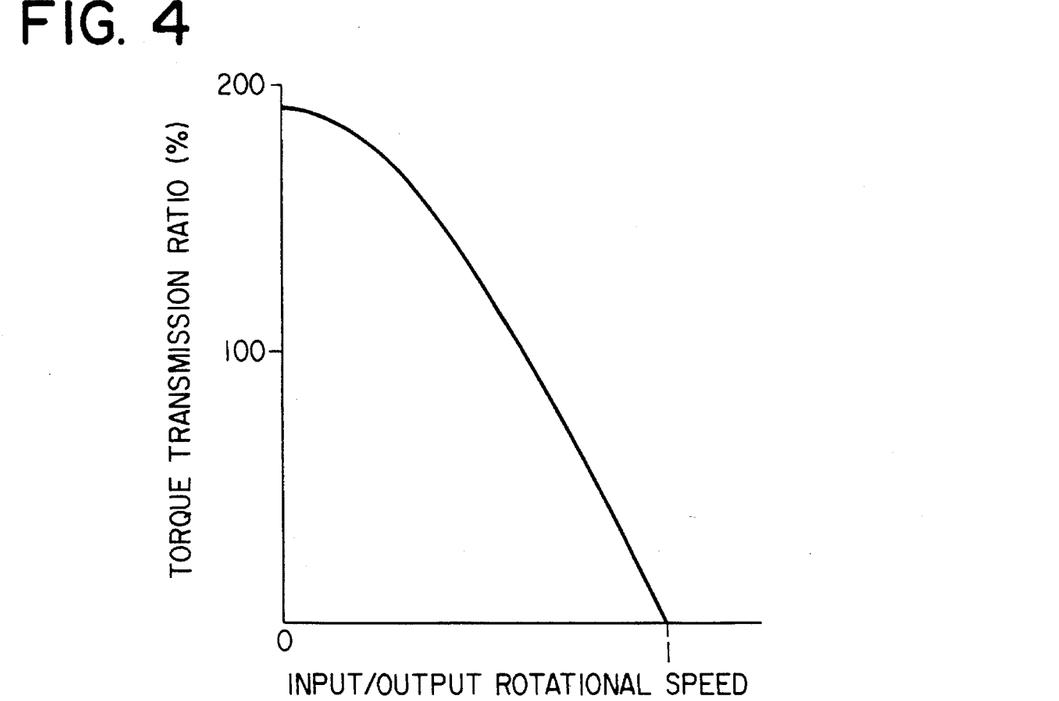
FIGS. 4 to 8 are views for graphically illustrating various running characteristics of a motor vehicle, respectively.

A torque transmission ratio detecting means M4 detects a torque transmission ratio on the basis of input/output rotational speeds a torque converter which is incorporated in the automatic transmission T. The torque transmission ratio can be determined based on the relationship a illustrated in FIG. 4 which is previously established on the basis of a ratio between an input speed (rpm) to the torque converter (i.e., the engine rotational speed) and an output or turbine speed (rpm) of the torque converter. In this conjunction, it should be noted that although the above relation is graphically illustrated in FIG. 4, such a relation is prepared in the form of a table or map stored in a memory in practical applications. The same holds true for the graphical representations shown in FIGS. 5, 6, 7 and 8. In a state where the torque converter is locked up for direct mechanical transmission of the engine torque, the torque transmission ratio is regarded to be "1", while in the case where a lock-up clutch is operating in a slip mode, the torque transmission ratio is arithmetically determined by taking into account the slip. Detection of the turbine speed may be realized by pulse generators (corresponding to the turbine input speed sensor 4 and the turbine speed sensor 3 shown in FIG. 1) which are installed in a torque converter section of the transmission T.

A gear ratio detecting means M5 detects the gear ratio of the transmission. In the case of a manual transmission, the gear ratio can arithmetically be determined as a ratio of the rotational speed or number (rpm) of an output shaft of an unillustrated clutch of the transmission or alternatively a ratio of the engine speed (rpm), when the clutch is in the coupled state, to the rotational speed or number (rpm) of the output shaft of the transmission. On the other hand, in the case of an automatic transmission incorporating therein a torque converter as illustrated in FIG. 1, the gear ratio may be determined as a ratio of the turbine speed (rpm) of the torque converter to the rotational speed (rpm) of an output shaft of the transmission or alternatively it can be determined on the basis of data of gear positions used in a controller for controlling the automatic transmission. A neutral position detecting means M6 serves to detect a neutral position of the transmission on the basis of the neutral or inhibitor switch 2 shown in FIG. 1.

Further, a clutch detecting means M7 detects the coupling state of a clutch as required in the case of a manual transmission. The clutch detecting means M7 may be a conventional clutch switch or the like. A vehicle weight detecting means M8 detects the total weight of the motor vehicle on the basis of the weight sensor 5, as is required for a motor track, motor lorry or the like of which weight often undergoes significant changes. For the purpose of this detection, the weight sensor 5 (FIG. 1) is installed which may be constituted by a load cell or the like mounted, for example, on a suspension of the motor vehicle. A brake detecting means M7 detects on the basis of the output signal from the brake switch 6 whether or not a brake pedal is depressed. The brake switch 6 may be a brake lamp switch shown in FIG. 1 or the like. The running resistance calculating unit M10 serves to arithmetically determine the Punning resistance of the motor vehicle on the basis of the outputs of the various detecting means mentioned above.

Figure 3A:
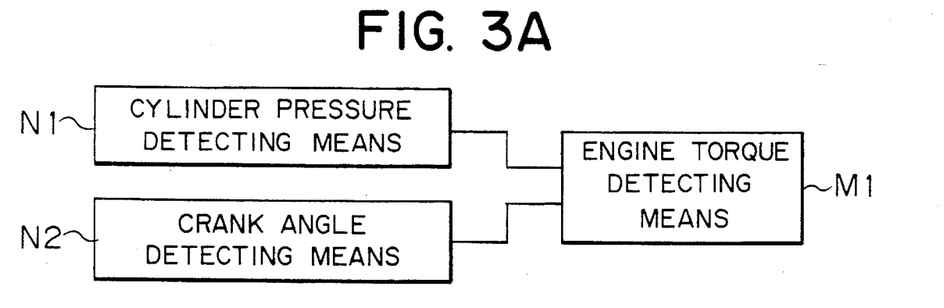
FIGS. 3A to 3D are views for illustrating various modes of determining the magnitude of an engine torque, respectively.
Figure 3B:
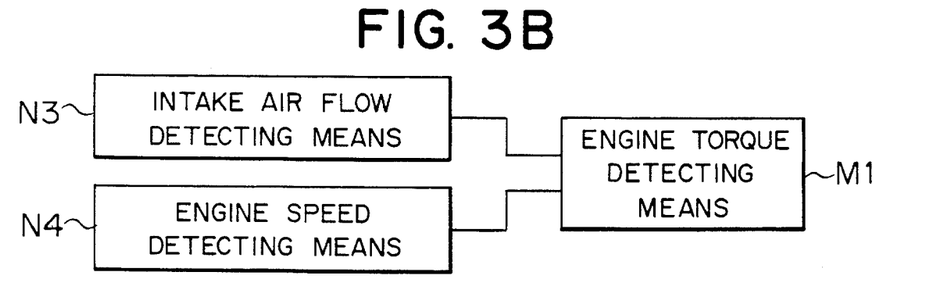
Figure 3C:
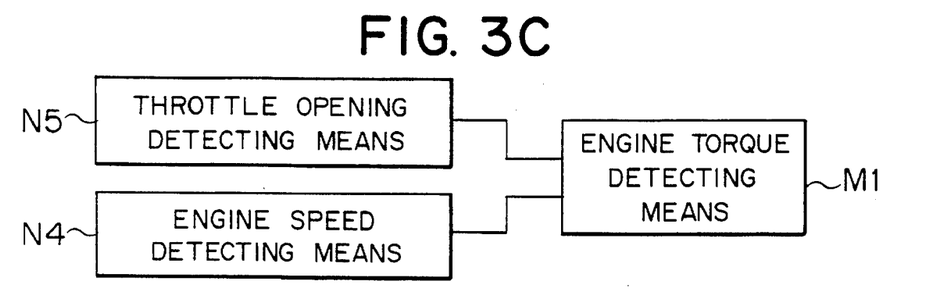
Figure 3D:
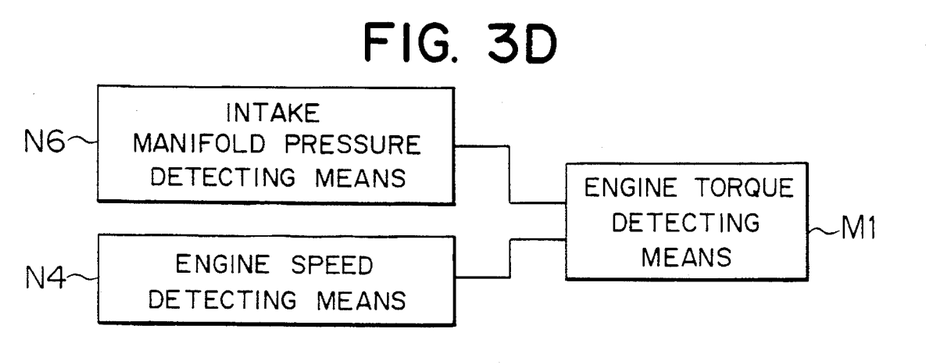

The engine torque detecting means M1 calculates the engine torque on the basis of a cylinder pressure in each cylinder Cy as illustrated in FIG. 3A, or the flow rate of intake air as illustrated in FIG. 3B, or the degree of opening of the throttle valve as illustrated in FIG. 3C, or the intake pressure in the intake manifold as illustrated in FIG. 3D.

Referring to FIG. 3A, according to the method of determining the engine torque based on the cylinder pressure, the output from a pressure detecting means N1, which may be constituted by the pressure sensor 13 for detecting the cylinder pressure, as well as the output from a crank angle detecting means N2, which may be the crank angle sensor 15 shown in FIG. 1, are utilized for arithmetically determining the engine torque. In this conjunction, let Pn represent the pressure detected at every predetermined crank angle, $\Delta V$ represent a change in the stroke or displaced volume brought about every time the crank angle changes by e predetermined value (e.g., 2 degrees), and V represent the stroke volume. Then, a mean effective cylinder pressure Pi can be calculated in accordance with the following equation:

$$Pi = \Sigma(Pn \times \Delta V)/V \tag{1}$$

From the mean effective cylinder pressure Pi thus calculated, the engine torque Ti can be determined as follows:

$$Ti = 10 \times V \times Pi/4\pi \tag{2}$$

A net torque Te can then be derived from the torque value determined by equation (2) mentioned above in accordance with the following equation:

$$Te = Ti - Tf \tag{3}$$

where Tf represents a friction torque,

In the case of detecting the engine torque from the intake air flow rate as shown in FIG. 3B, there are employed an intake air flow rate detecting means N3 such as, for example, the flow sensor 10 (FIG. 1) for detecting the intake air flow rate Q as well as an engine speed detecting means N4 such as, for example, the turbine input speed sensor 4 or the like for detecting the engine speed n (rpm). At first, a charging efficiency CE is calculated in accordance with the following equation:

$$CE=Q/n \quad (4)$$

Figure 5:
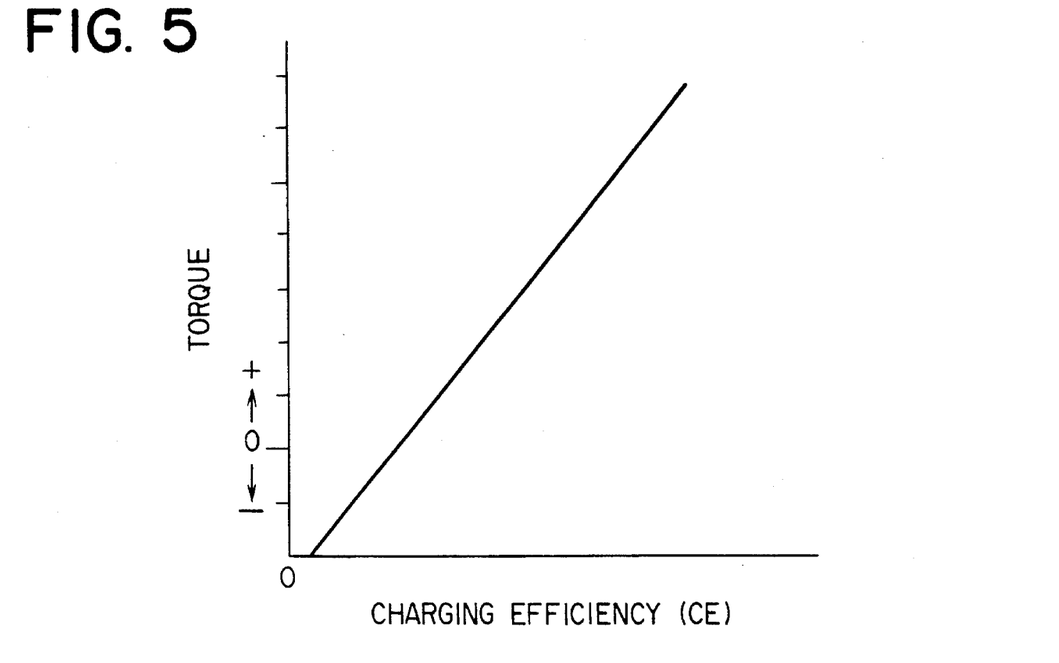
Figure 6:
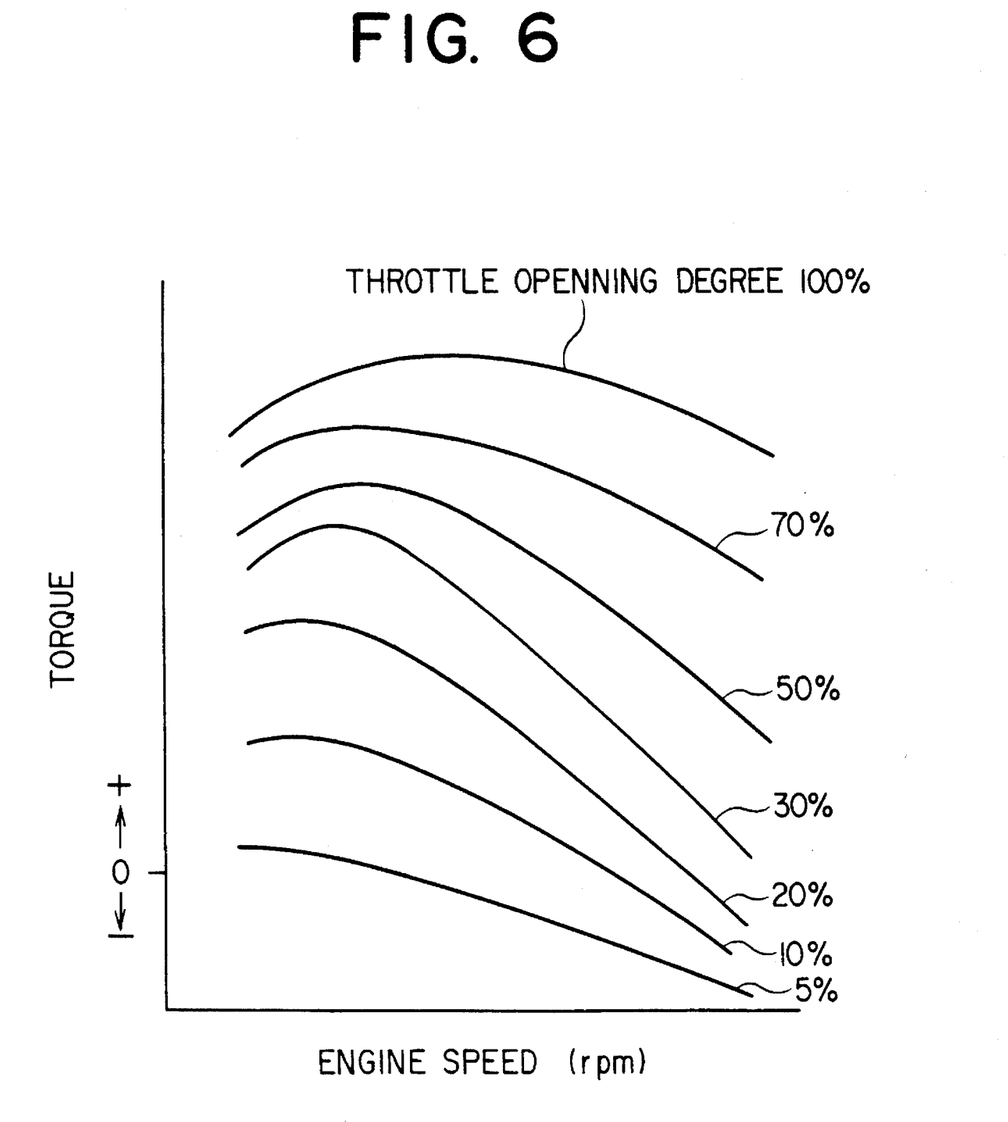
Figure 7:
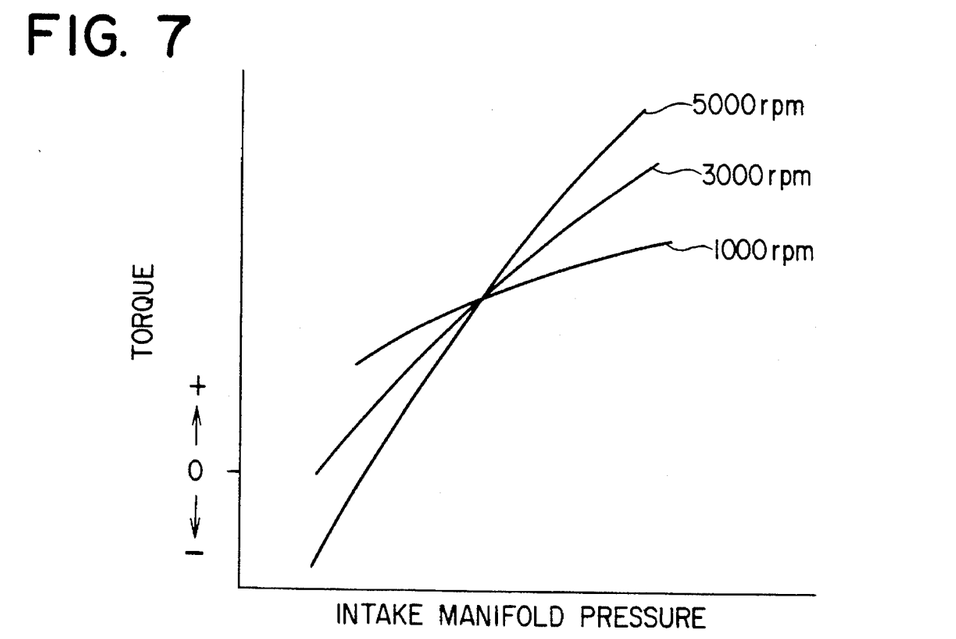

Subsequently, a table indicating a relation between the charging efficiency and the engine torque, as is graphically illustrated in FIG. 5, is consulted by using the charging efficiency CE as a parameter to thereby determine the engine torque, According to the method of arithmetically determining the engine torque on the basis of the throttle opening degree, as shown in FIG. 3C, use is made of the output of a throttle opening detecting means N5 corresponding to the throttle sensor 8 shown in FIG. 1 as well as the output of the engine speed detecting means N4 mentioned above. A map of FIG. 6 indicating relations between the engine torque and the engine speed is referred to with the throttle opening degree being used as a parameter to thereby determine the engine torque.

Finally, according to the method of determining the engine torque from the intake pressure within the intake manifold (shown in FIG. 3C), outputs of an intake manifold pressure detecting means N6 and the engine speed detecting means N4 are utilized. By consulting a map of FIG. 7, which represents relations between the engine torque and the intake manifold pressure by using the engine speed (rpm) as a parameter, the engine torque can be determined.

Figure 8:
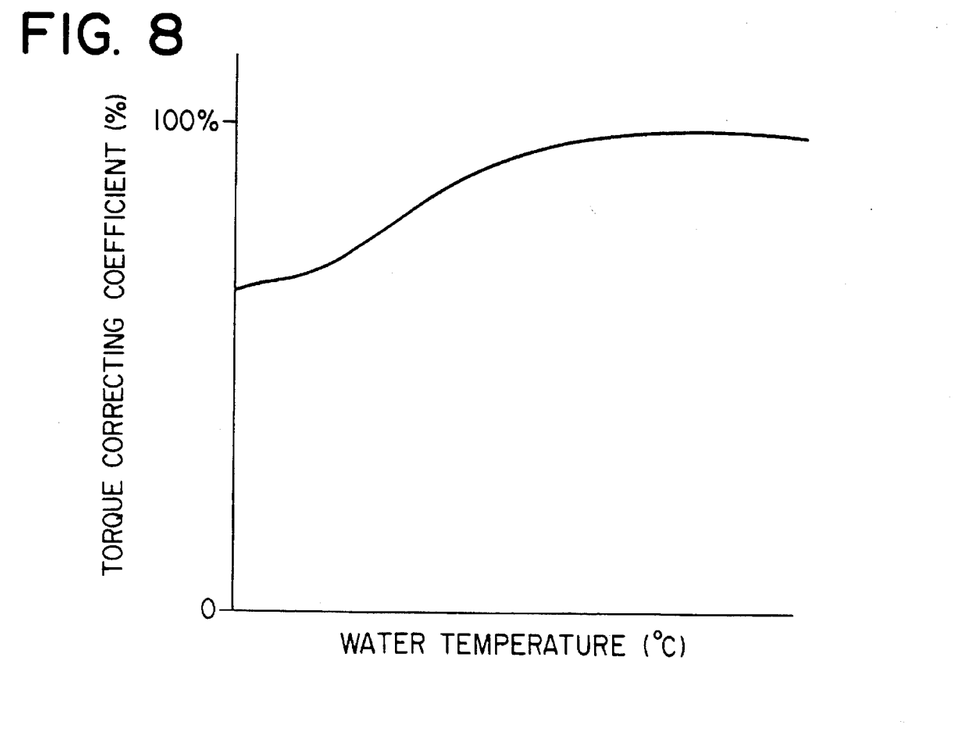

The torque detected by and one of the four detecting methods described above should preferably be corrected by consulting a table, which is graphically represented in FIG. 8, in view of the fact that the friction torque and other torque components are susceptible to the influence of the engine temperature.

Figure 9:
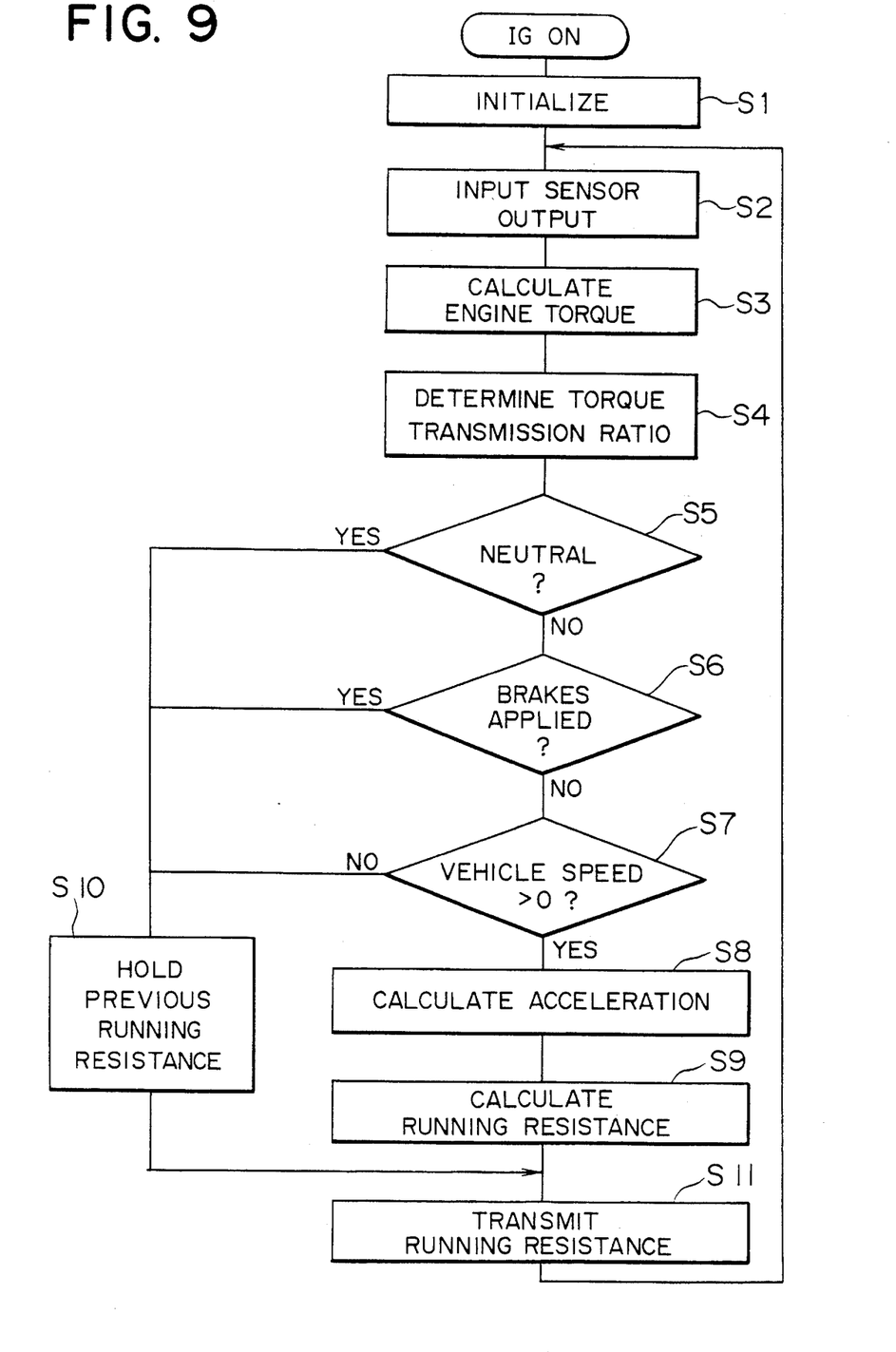
FIG. 9 is a flow chart showing an exemplary procedure for determining the running resistance of a motor vehicle according to of the invention.

FIG. 9 is a flow chart showing an exemplary processing routine or procedure for determining the running speed of a motor vehicle. Parenthetically, a series of operations involved in the illustrated procedure is activated by turning the ignition switch on.

Referring to FIG. 9, in a first step S1, a memory in the form of a random access memory (RAM) used for the torque calculation is cleared and a value of the running resistance, to which the vehicle is subjected during travelling on a level road, is set (i.e., the running resistance value is initially set). Subsequently, in a step S2, output signals are input to the running resistance calculating means 16 from the various sensors such as the pressure sensor 13, throttle sensor 8, intake air flow sensor 10, temperature sensor 14 and the weight sensor 5 as well as pulse signals output from the engine speed sensor (the turbine input speed sensor 4), crank angle sensor 15, turbine speed sensor 3 and the vehicle speed sensor 1 together with digital signals supplied externally from a clutch switch (not shown), the brake switch 6 and others.

In a step S3, a process for detecting the engine torque is performed. More specifically, the engine torque is arithmetically determined by resorting to one of the four methods described above by with reference to FIGS. 3A to 3D. Further, in a step S4, the gear ratio and the torque transmission ratio are determined on the basis of the engine speed (rpm) and the input and output speeds of the transmission. In a step 85, decision is made as to whether the transmission is in the neutral position or coupled to the clutch. In case the transmission is coupled to the clutch, the process proceeds to a step S6 and otherwise to a step 10 for holding the running resistance detected in the preceding process.

In the step S6, it is decided whether or not the brake pedal is depressed by detecting the state of the brake switch 6. In case the brake pedal is depressed, the process proceeds to a step S7 and otherwise to the step S10 for holding the running resistance detected in the preceding process because the running speed cannot correctly be detected due to the braking resistance. On the other hand, in the step S7, decision is made as to whether or not the vehicle speed exceeds "0". If the answer to this question is affirmative (YES), the process proceeds to a step S8, whereas if the vehicle speed is equal to "0", the step S10 is executed for holding the running resistance.

In the step S8, a vehicle acceleration is arithmetically determined on the basis of a difference or variation in the vehicle speed between the current time point and a preceding time point before a predetermined period therefrom. In a succeeding step S9, the running resistance R is calculated on the basis of the torque generated by the engine, the gear ratio, the torque transmission ratio, the acceleration and weight of the motor vehicle, and a rotating weight of the vehicle equivalent to the moment of rotatable portions of the vehicle in accordance with the following equation:

$$R=T\times G1\times r/(1\times \alpha \times m) \quad (5)$$

where T represents the engine torque; G1 represents the gear ratio inclusive of a final reduction gear ratio; r represents the radius of the road wheels or tires; α represents the vehicle acceleration; and m represents the overall weight of the motor vehicle.

The weight m is a sum of a vehicle body weight m1 and a rotating weight m2 equivalent to a moment of rotating portions of the vehicle. Namely, $$M=m1+m2 \quad (6)$$

At this juncture, it should be noted that the rotating weight m2 should preferably be altered as a function of the gear ratio because the former varies in dependence on the latter.

In a motor vehicle equipped with a torque converter (i.e., in a so-called AT car), a gear ratio G2 obtained by correcting G1 in consideration of the torque transmission ratio C as given by the following equation (7) should be used.

$$G2=G1\times C \quad (7)$$

Thus, in equation (7) above, G2 represents a total torque derived by correcting or modifying the output torque of the torque converter to take into account the gear ratio.

Upon completion of the determination of the running resistance, data thereof is transmitted to a controller such as the engine control unit, as occasions require, in a step S11, whereupon the step S2 is returned to. By repeating the processing routine described above, the running resistance can consecutively be detected on a real-time basis.

As will be appreciated from the foregoing description, it is possible according to the teachings of the invention to consecutively or successively detect the running resistance with a degree of high accuracy, whereby the performance of a control apparatus for a motor vehicle which demands an alteration of control constants and control modes or methods in dependence on the running state of the vehicle can significantly be enhanced. Besides, because the control constants and the control modes which have heretofore been manually changed by the driver can now be altered automatically so as to be appropriate for the current running state on a real-time basis, a burden imposed on the driver can be mitigated to another advantage.

While the invention has been described in terms of its preferred embodiments, it should be understood that numerous modifications may be made thereto without departing from the spirit and scope of the invention. It is intended that all such modifications fall within the scope of the claims.

What is claimed is:

1. A running resistance detecting apparatus for a vehicle having an engine, comprising:

torque detecting means for detecting an output torque of said engine and generating a corresponding output signal;

temperature sensor coupled to said engine;

correcting means for correcting the output torque of said engine based on the temperature of said engine as sensed by said temperature sensor;

acceleration calculating means for calculating an acceleration of said vehicle and generating a corresponding output signal;

vehicle weight detecting means for detecting an overall weight of said vehicle, the overall weight being representative of the weight of the vehicle and rotating weight of the vehicle, said vehicle weight detecting means comprising means for detecting and altering the rotating weight of the vehicle based on the gear ratio of said vehicle; and running resistance calculating means for calculating a running resistance of said vehicle indicative of a running stage thereof on the basis of the engine torque detected by said torque detecting means and corrected by said correcting means, the vehicle acceleration calculated by said acceleration calculating means, and the overall weight of the vehicle as detected by said vehicle weight detecting means.

2. A running resistance detecting apparatus according to claim 1, wherein said vehicle includes road wheels and a transmission for changing a gear ratio whereby the engine output torque transmitted to said road wheels is properly controlled; and the running resistance R is determined in accordance with the following formula:

$$R = T \times G1 \times r/(1 - \alpha \times m)$$

where T represents the engine torque; G1 represents a gear ratio in said transmission; r represents a radius of said road wheels; $\alpha$ represents the acceleration of said vehicle; and m represents a weight of said vehicle.

3. A running resistance detecting apparatus according to claim 2, wherein the engine torque is determined on the basis of a cylinder pressure and a crank angle of said engine.

4. A running resistance detecting apparatus according to claim 2, wherein the engine torque is determined on the basis of a flow rate of intake air sucked in said engine and a rotational speed of said engine.

5. A running resistance detecting apparatus according to claim 2, wherein the engine torque is determined on the basis of a degree of opening of a throttle valve and a rotational speed of said engine.

6. A running resistance detecting apparatus according to claim 2, wherein the engine torque is determined on the basis of an intake pressure in an intake manifold and a rotational speed of said engine.

7. A running resistance detecting apparatus according to claim 2, wherein the vehicle acceleration is determined on the basis of a change in a rotational speed of said engine.

8. A running resistance detecting apparatus according to claim 2, wherein said transmission includes a torque converter, and the gear ratio is determined in accordance with a torque transmission ratio of said torque converter.

9. A running resistance detecting apparatus according to claim 1, wherein said vehicle is equipped with at least one of a cruise control device, an automatic transmission device, a traction control device, a power steering device, and a suspension control device, and said apparatus further comprises means for changing control constants and control modes for at least one of said devices in accordance with the running resistance of said vehicle as calculated by said running resistance calculating means.

* * * * *